United States Patent [19]

Guisinger

[11] Patent Number: 4,561,028
[45] Date of Patent: Dec. 24, 1985

[54] APPARATUS AND METHOD FOR READING AND WRITING DATA ON A MAGNETIC DISC

[75] Inventor: Barrett E. Guisinger, Saratoga, Calif.

[73] Assignee: Sony Corporation, Tokyo, Japan

[21] Appl. No.: 524,337

[22] Filed: Aug. 18, 1983

[51] Int. Cl.$^4$ .............................................. G11B 5/56
[52] U.S. Cl. ..................................................... 360/77
[58] Field of Search ......................................... 360/77

[56] References Cited

U.S. PATENT DOCUMENTS

| | | | |
|---|---|---|---|
| 4,074,328 | 2/1978 | Hardwick | 360/77 |
| 4,149,198 | 4/1979 | Behr et al. | 360/77 |
| 4,166,282 | 8/1979 | Ragle et al. | 360/77 |
| 4,321,634 | 3/1982 | Lehureau | 360/70 |
| 4,347,534 | 8/1982 | Kimura | 360/77 |
| 4,419,700 | 12/1983 | Ragle et al. | 360/77 |

OTHER PUBLICATIONS

High Technology, vol. 3, No. 8. Aug. 1983, pp. 18–19, Microcomputers–Floppy Disks Push Density Limits, C. Lu.

Primary Examiner—George G. Stellar
Attorney, Agent, or Firm—Philip M. Shaw, Jr.

[57] ABSTRACT

Apparatus and method for controlling a magnetic head carriage while reading or writing data on a magnetic disc by the use of a pair of heads having zero intertrack spacing and having azimuth angles of plus and minus 45° with the circumference of the disc to sense the timing and phasing of sector sync pulses recorded on the disc and, from such timing phasing, as read by the heads, the rotational position of the disc and the radial position of the head carriage, to generate an appropriate head carriage servo signal which compensates for eccentricity of the disc.

11 Claims, 5 Drawing Figures

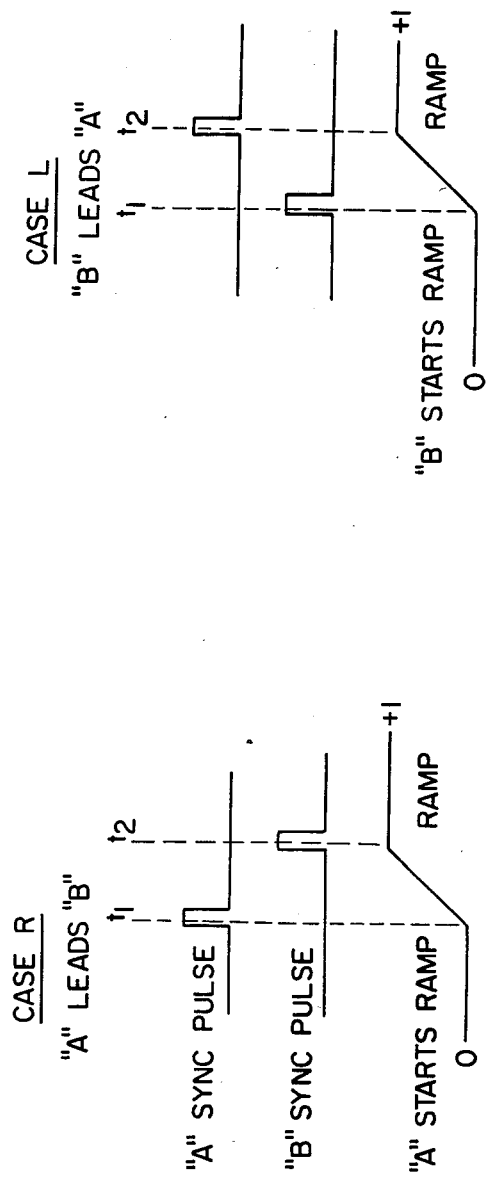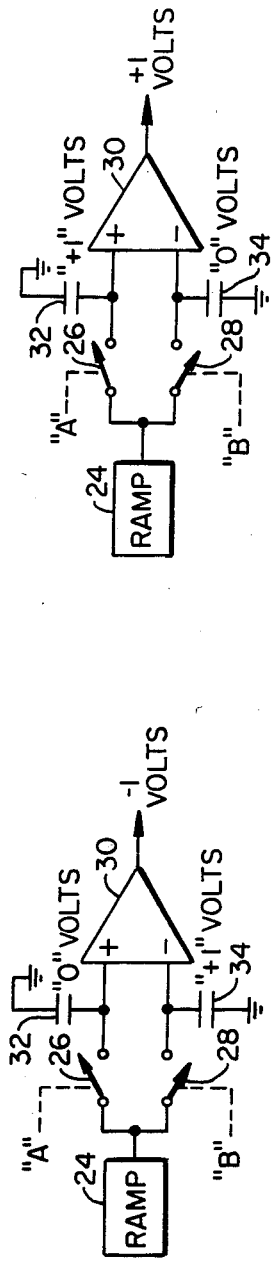
FIG. 4.
FIG. 5.

APPARATUS AND METHOD FOR READING AND WRITING DATA ON A MAGNETIC DISC

TECHNICAL FIELD

This invention relates to the recording of magnetic tracks on a disc medium and, more particularly, to a method and apparatus for increasing the density of such tracks.

BACKGROUND ART

Prior art disc recorders have been able to increase track density by using a special buried servo track which enables detection of track eccentricity and subsequent servoing of the head carriage mechansim. Another form of this same technique uses a reference track about the circumference of the disc or simply adds a servo disc. Either method requires the recording and reproduction of a special signal for this purpose only. Thus, such systems are not capable of using magnetic discs which lack this reference or servo track. Increasing track density by using a fixed, non-removable hard disc can be accomplished simply by greater precision in manufacturing the discs and the servo system. Because of the inherent mechanical sloppiness of a flexible disc (known in the trade as a "floppy" disc), however, increased track density is harder to achieve in these devices.

What is needed is a floppy disc whose information storage ability will render it competitive with the capabilities of the standard hard discs. Such discs would not only be useful for standard software applications, but could be used for storing up to fifty digital video slides on one three and a half inch disc or for storing up to twenty x-ray images in digital form.

SUMMARY OF THE INVENTION

The above and other problems or prior art tracking methods and apparatus are overcome by the present invention of a method and apparatus for reading and writing data signals along concentric tracks on a rotating recording medium, and in particular, on a flexible disc. The apparatus of the invention comprises a pair of transducer heads for reading and writing data signals along predetermined, separate axes, with the heads being oriented with respect to each other such that their axes form an acute angle therebetween. Servo means movably support the heads in a plane which is parallel to the recording medium and spaced from it by a predetermined distance selected to allow the heads to read signals from and record signals on the medium. Means supplied with the output signals of the heads generate a servo tracking signal representative of the eccentricity of the disc. The servo means include means responsive to a control signal and the servo tracking signal for selectively moving the heads incrementally in a radial direction with respect to the medium to read from and record on the medium in concentric tracks.

In the preferred embodiment of the invention, additional control means determine the approximate radial position of the heads relative to the axis of rotation of the disc and the radial position of the disc. The control means then generates the servo tracking signal as a function of the head outputs, the radial position of the heads and the rotational position of the disc. Storage means are provided for storing the servo tracking signal. Further means, connected to the last two means, are provided for reading the servo tracking signal from the storage means during recording of signals on the disc.

In the preferred embodiment of the invention, the heads are magnetic record and play heads which are arranged with zero intertrack spacing and to have opposing gap azimuth angles.

The disc medium has prerecorded sector signals on the tracks and the servo signal generating means further comprises sample means connected to the heads for generating an error signal which is representative of the magnitude and direction of displacement of the heads from the center lines of a predetermined pair of tracks as the heads read the sector signals. Means are provided for supplying the error signal to the control means.

It is therefore an object of the present invention to provide a method and apparatus for increasing the track density on a recording disc medium having a standard format.

It is yet another object of the invention to provide a method and apparatus for increasing the track density without the requirement of a special reference or servo track.

It is yet a further object of the invention to automatically compensate for eccentricity in reading and writing data on a disc recording medium without the requirement of a reference track.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIGS. 4 and 5 are schematic and waveform illustrations for use in explaining the operation of the invention.

BEST MODE FOR CARRYING OUT THE INVENTION

Figure 1:
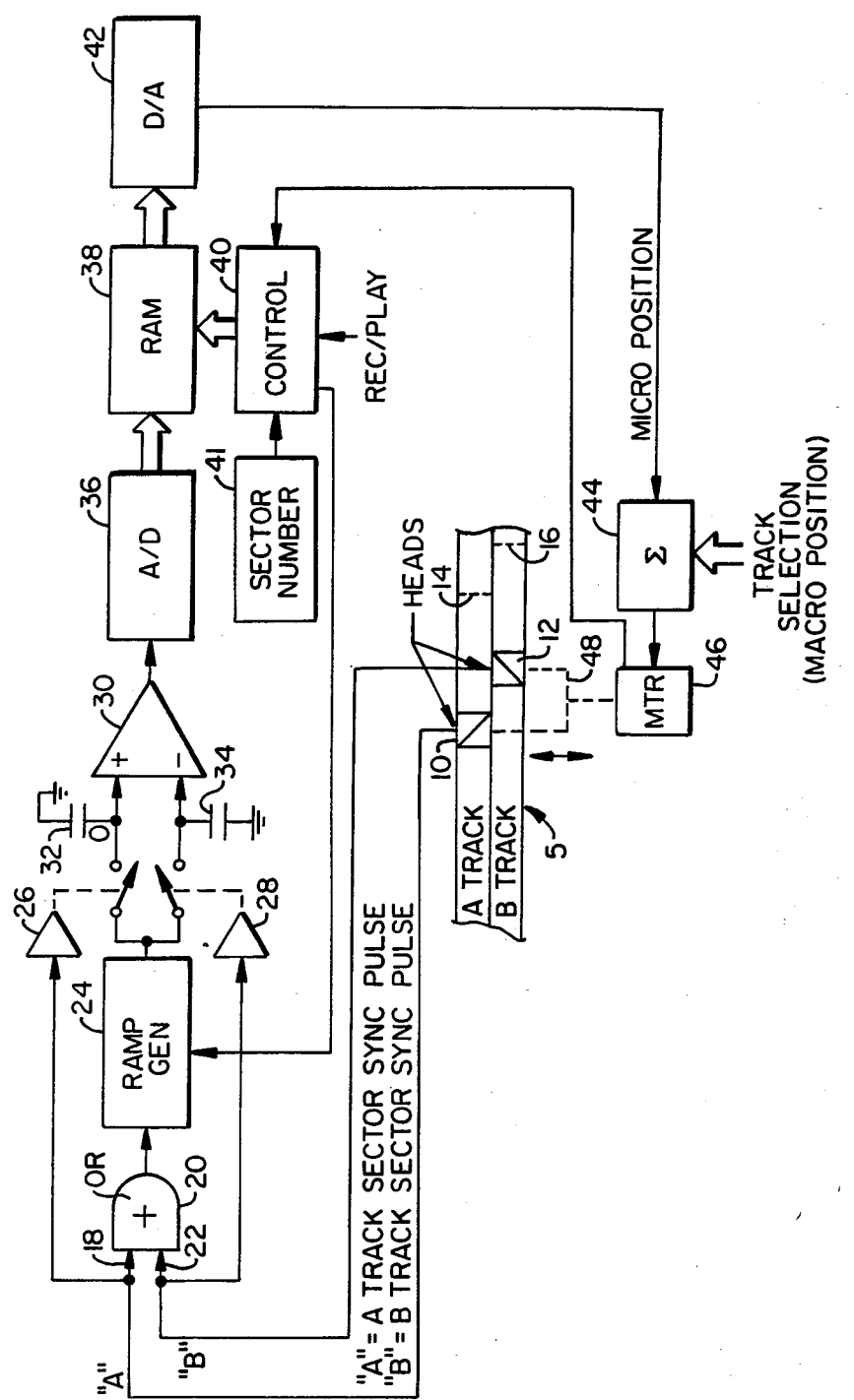
FIG. 1 is a block diagram of the apparatus according to the invention.

Referring now more particularly to FIG. 1, a pair of magnetic read and write heads 10 and 12 are positioned to read and write data on information tracks labeled A and B on a magnetic disc recording medium 5. While the improved tracking system of the invention is primarily intended for use with a flexible disc 5, it can also be beneficially used with a "hard" disk. The heads 10 and 12 are arranged to read adjacent tracks with zero intertrack spacing and have opposing gap azimuth angles of plus or minus forty-five degrees with respect to the longitudinal axes of the tracks, i.e. the centerlines of the tracks. By using the two heads 10 and 12, the tracks A and B can be recorded simultaneously or separately with each head carriage step in the radial direction indicated by the arrow. Since the adjacent tracks are recorded with a relative gap angle of ninety degrees, no interchannel cross talk will result.

It is common in using such magnetic recording disc media to format the disc so as to have a plurality of prerecorded "sectors." These sectors take the form of radially extending, recorded data "edges" 14 and 16 all of which would lie on the same radially extending line for all odd numbered tracks, including track A, and another radially extending line for all even numbered tracks, including track B for a given sector. If the heads 10 and 12 were radially aligned, the sector lines for tracks A and B would be the same. Since the heads 10 and 12 are not readily aligned, the sector lines 16 for the even numbered tracks will be angularly displaced from the sector lines 14 for the odd numbered tracks, corresponding to the amount of relative circumferentially displacement of the heads 10 and 12. It will be appreciated that, from a signal point of view, these sector lines are read at the same time as though they all fell on the same sector line regardless of whether the track is odd or even numbered since the formatting is done by the displaced heads in the first place.

The outputs from the heads 10 and 12 are supplied to separate inputs 18 and 22, respectively of an OR gate 20. The output of the OR gate is supplied to the trigger input of the ramp generator 24. The output of the head 10 is also supplied to the input of an electronic switch 26 which, upon the input of a pulse to the switch 26, will momentarily connect the output of the ramp generator to the non-inverting input of a differential amplifier 30.

The output of the head 12 is supplied to the other input 22 of the OR gate 20 and to an electronic switch 28, which, during the receipt of a pulse from the head 12, will momentarily connect the output of the ramp generator 24 to the inverting input of the differential amplifier 30. A capacitor 32 is connected between the non-inverting input of the differential amplifier 30 and the circuit ground. A capacitor 34 is connected between the inverting input of the differential amplifier 30 and the circuit ground. As will be explained in greater detail hereinafter, the purpose of the capacitors 32 and 34 is to sample and hold the output of the ramp generator as it is momentarily supplied into the inputs of the differential amplifier 30 through the switches 26 and 28.

The output of the differential amplifier 30 is converted from an analog form to a digital form by an A/D converter 36 whose digital output is input to a random access memory 38. The ramp generator 24 and the RAM 38 are controlled by a controller 40, e.g. a microprocessor, whose informational inputs include the current sector number being read or written into, a record or play control signal, and a shaft position signal from the head carriage motor 46 which represents the radial position of the heads 10 and 12. The current sector number 41 is derived by sensing a standard marker on the disc, typically in the form of a punched hole near the center of the disc and then simply counting the sectors detected from that point on for one complete revolution. Such sensors are conventional and will not be further described.

The output signal from the A/D converter 36 is processed by the controller 40 along with its other informational inputs as described along with its other informational inputs as described above, to generate a digital servo tracking signal which represents the amount of head position correction which is necessary for each track in each sector as the disc rotates to compensate for the eccentricity of the disc.

The output of the random access memory 38 is converted into an analog form by a D to A converter 42 whose analog output is input as an analog servo tracking signal to a servo control circuit 44. The servo control circuit 44 also receives the track selection information from the central processing unit and, utilizing both the servo tracking signal and the track selection information, generates a signal to the head carriage motor 46 to cause it to move the head carriage 48 to the selected set of tracks and to thereafter continuously align the heads accurately with the centerlines of the tracks. The basic head carriage mechanism and track selection circuitry are well-known to those skilled in the art and will not be described in greater detail since they do not form a part of the invention. Typical such mechanisms and circuitry are described in greater detail in U.S. Pat. No. 4,072,990 and No. 4,377,827, for example.

Figure 2:
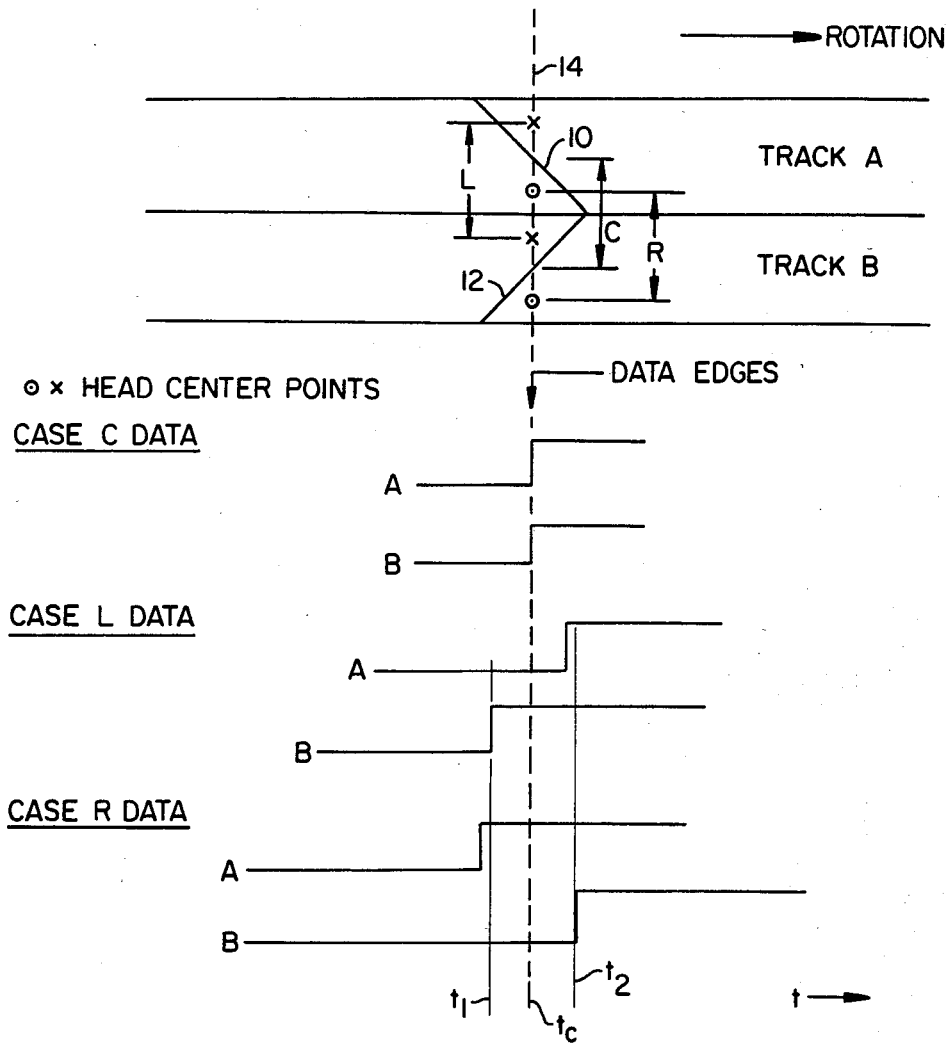
FIG. 2 is a waveform diagram for purposes of illustrating the operation of the invention.
Figure 3:
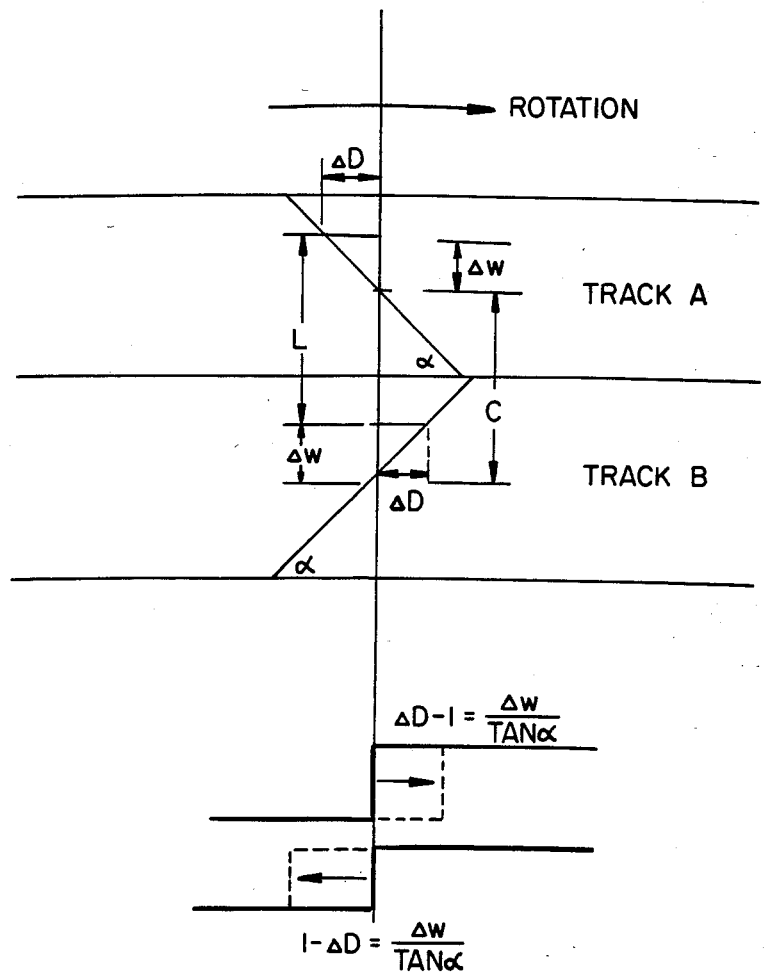
FIG. 3 is an illustration for use in explaining the operation of the invention.

The operation of this system can best be understood by understanding the operation of the heads 10 and 12 relative to the data edges, i.e. the sector sync pulses 14 and 16 which have been prerecorded on the tracks A and B during the formatting operation. Referring now more particularly to FIGS. 2 and 3, for purposes of explaining the operation of this system, it will be assumed that the sector sync pulses 14 and 16 are physically aligned although, as illustrated in FIG. 1, they are not actually physically aligned because of the relative circumferential offset of the heads. However, in terms of the electronic pulses read by the heads 10 and 12, the sector sync pulses 14 and 16 will appear to the circuitry as though they are physically aligned along the same radially extending line across all of the tracks of the disc. For ease of explanation, this sync pulse line has been designated 14 in FIGS. 2 and 3. The heads 10 and 12 have been illustrated in the Figure simply by drawing their gap azimuth angles, which, as can easily be seen from the Figure, are plus and minus 45 degrees with respect to the longitudinal axes of the tracks A and B. The arrow in FIGS. 2 and 3 indicates the direction of rotation of the disc 5.

Because the heads 10 and 12 are oriented at 90 degrees with respect to each other the head 10 will read no information from track B and the head 12 will read no information from track A. The peak amplitude of any pulse read by either head 10 or 12 from the tracks A and B will occur as the effective center line of the gap of the head 10 passes radially over the extending line 14 representative of the sector sync pulses. Assuming that the heads 10 and 12 are correctly centered over the tracks A and B, the heads will produce output pulses as illustrated in case C which are coincident at time $t_c$. If the heads are shifted to the position L, so that the head 12 partially overlies the track A, the effective center of the gap for the head 12, i.e. the center of that portion of the head gap which overlies track B, will encounter the sector sync pulse prior to the effective center of the gap for the head 10. This will produce an output pulse from the head 12 which occurs at a time $t_1$ prior to the time $t_c$. The head 10 will produce an output pulse at a time $t_2$ which is later than $t_c$. Conversely, if the heads 10 and 12 are shifted such that the head 10 overlies the track B, as in case R, the effective center of the gap of the head 10 will encounter the sector sync pulse at the time $t_1$ and the head 12 will encounter the sector sync pulse at a time $t_2$ and correspondingly, the output pulse from the head 10 will precede in time the output pulse from the head 12. The amount of time between the output pulses and the phasing indicate the magnitude and direction, respectively, of the displacement of the head.

Referring now more particularly to FIG. 3, it can be seen that the magnitude of the offset of the sync pulse output from the heads, denoted delta D in the figures, is equal to the amount of the displacement in the radial direction (delta W) divided by the tangent of the angle α formed by the head gap with the longitudinal axis of the tracks A and B.

Referring now more particularly to FIGS. 4 and 5, the operation of the block diagram depicted in FIG. 1 will be explained in greater detail. Taking the situation of case R in which head 10 has shifted radially to overlie the track B, the sector sync pulse in track A will be produced at the output of the head 10 at a point in time prior to the sector sync output pulse from the head 12. This output pulse from the head 10 will trigger the ramp generator 24 to begin generating a ramp output signal and will simultaneously, and momentarily, connect the output of the ramp 24 to the non-inverting input of the amplifier 30. Since at this point, the ramp output is zero, a "charge" of zero volts will be stored on the capacitor 32 at the non-inverting input of the amplifier 30. At the point in time $t_2$ when the sector sync pulse from the B track is received by the head 12, it will stop the ramp generator and momentarily supply the output of the ramp, at that point in time, to the inverting input of the amplifier 30. Assuming that the ramp output voltage has increased to approximately plus one volt at the time $t_2$, a voltage of plus one volt will be stored in the capacitor 34. The differential output of the amplifier 30 will then be minus 1 volt. This voltage indicates the magnitude of the head displacement. The polarity of the voltage indicates the direction of the displacement.

Referring now more particularly to FIG. 5 and taking the situation of case L, that is the head 12 has shifted radially to overlie the track A, the sector sync pulse from track B, which is output by the head 12, will cause the ramp to begin generating the ramp output voltage and will simultaneously and momentarily supply the output of the ramp generator 24 to the inverting input of the amplifier 30. Thus, a zero volt signal will be stored on the capacitor 34 at time $t_1$. When the sector sync pulse from track A is read by the head 10 at time $t_2$, the ramp generator will be caused to stop generating and the output at that point in time will be momentarily supplied through the electronic switch 26 to the non-inverting input of the amplifier 30. Assuming that the ramp output has reached a voltage level of plus one, a value of plus one volts will be stored on the capacitor 32. Thus, the differential output of the amplifier 30 will then be plus one volt, again indicating the magnitude of the displacement and, by the polarity, the direction.

Referring to FIG. 1, the output of the amplifier 30 is converted into digital form by the A/D converter 36 and is supplied to the RAM 38. Assuming that the heads 10 and 12 are operating in the play mode, the error signal output from the amplifier 30 will simply be passed through the RAM, converted back into analog form by the D to A converter 42 and will be supplied as the servo tracking signal to the servo control circuit 44. This will cause the heads 10 and 12 to be correctly centered over the tracks A and B, while the information is being read off these tracks.

During the record mode, the operation must be different. During recording the control logic 40 sets the tracking error to zero. The outputs from the heads 10 and 12 are then monitored to see if there is any sector information already present on the disc. If the disc is blank, then no servo signal needs to be generated and the disc is simply formatted in the usual way and the information thereafter is recorded on it. If, on the other hand, the disc has already been formatted and the sector sync pulses recorded thereon, it is necessary to produce a servo tracking signal which indicates the degree of eccentricity of the disc as a function of the sector number and the radial position of the heads 10 and 12. This is done by measuring the error signal produced from the output of the differential amplifier 30 for each sector while reading any particular track, and this error signal, for that track, is stored in the random access memory 38. During recording, this stored error signal, sector by sector, is supplied through the D to A converter 36 to the servo control circuitry 44 under the control of the microprocessor 40 as a function of the radial position of the heads 10 and 12 as measured by sensing the shaft position of the motor 46. This correlation with the radial position of the heads and the sector number is necessary since the magnitude of the eccentricity, as far as reading the sector sync pulses is concerned, will decrease as the heads are moved radially outwardly from the center of the disc. This can best be appreciated by viewing FIGS. 4 and 5. Since the linear speed of the outer tracks on the disc 5 is greater than the linear speed for the inner tracks, the same amount of head displacement over the outer tracks will result in a time difference of $t_1$ minus $t_2$ which is smaller than if the displacement took place over the inner tracks.

While in the description above the recording medium is contemplated as being disc shaped, the principles of the invention should also be applicable to other forms of a recording medium, such as in cylindrical form. Also, although it is contemplated that the present invention will find its greatest application in conjunction with magnetic media, the invention can be applied, in principle, to other recording schemes, such as optical recording. In such case, the sensors could be equipped with polarizing filters, for example, to be optically oriented at 90° to each other and 45° to the center line of the track.

The terms and expressions which have been employed here are used as terms of description and not of limitations, and there is no intention, in the use of such terms and expressions, of excluding equivalents of the features shown and described, or portions thereof, it being recognized that various modifications are possible within the scope of the invention claimed.

I claim:

1. Apparatus for reading and writing data signals along concentric tracks on a rotating, recording disc medium, with sector signals being prerecorded on the tracks, the apparatus comprising a pair of transducer heads for reading and writing data signals along predetermined, separate axes, the heads being oriented with respect to each other such that said axes form an acute angle therebetween, sample means connected to the heads for generating a servo tracking signal representative of the magnitude and direction of displacement of the heads from the centerlines of a predetermined pair of tracks as the heads read the sector signals, servo means for removably supporting said heads in a plane which is parallel to said recording medium and spaced from it by a predetermined distance selected to allow said heads to read signals from and record signals on said medium, the servo means including means responsive to a control signal and the servo tracking signal for selectively moving said heads incrementally in a radial direction with respect to said medium to read from and record on said medium in adjacent tracks.

2. Apparatus for reading and writing data signals along tracks on a rotating, recording medium, the apparatus comprising a pair of transducer heads for reading and writing data signals along predetermined, separate axes, the heads being oriented with respect to each other such that said axes form an acute angle therebetween, means supplied with the electrical output from said heads for generating a servo tracking signal, servo means for movably supporting said heads in a plane which is parallel to said recording medium and spaced from it by a predetermined distance selected to allow said heads to read signals from and record signals on said medium, the servo means including means responsive to a control signal and the servo tracking signal for selectively moving said heads incrementally in a radial direction with respect to said medium to read from and record on said medium in adjacent tracks, and wherein the recording medium is a disc, the tracks are concentric, and the servo tracking signal generating means includes means for determining the eccentricity of said disc from the output signals from the heads and for generating an error signal representative of said eccentricity, storage means for storing said error signal, means for determining the approximate radial position of said heads relative to said disc, and means for reading said error signal from said storage means as a function of the rotational position of the disc and for generating said servo tracking signal as a function of said error signal and the approximate rotational and radial position of said heads with respect to the disc.

3. Apparatus as recited in claims 1 or 2 wherein the medium is a magnetic material and said heads are magnetic record/play heads and are arranged with zero intertrack spacing and to have opposing gap azimuth angles.

4. Apparatus as recited in claim 3 wherein the gap azimuth angles are at plus and minus 45 degrees with respect to the track centerlines.

5. Apparatus as recited in claim 3 wherein said recording medium has a floppy substrate for supporting the magnetic material.

6. Apparatus as recited in claim 1 further comprising random access memory means for storing the error signal in digital form as a function of the sectors and the radial position of the heads and means for reading the stored error signal and supplying it as the servo tracking signal to the servo means during writing of data onto the disc medium.

7. Apparatus as recited in claim 1 wherein the sample means comprises an OR gate having two inputs, each of which is supplied with the output of a separate one of the transducer heads, and an output, ramp generator means which is supplied with the output of the OR gate as a trigger signal, a differential amplifier having separate inverting and non-inverting inputs and an output, separate capacitors connected to each input of the differential amplifier for storing input signals supplied thereto, a first electronic switch controlled by the output of one of the transducer heads for supplying the ramp generator output to the non-inverting input of the differential amplifier during sector pulse outputs from said transducer head, and a second electronic switch controlled by the output of the other transducer head for supplying the ramp generator output to the inverting input of the differential amplifier during sector pulse outputs from said other transducer head, whereby the differential amplifier's output will be an analog error signal whose magnitude corresponds to the amount of head mistracking and whose polarity is indicative of the direction of the mistracking.

8. Apparatus as recited in claims 1 or 6 further comprising means for sensing the rotational position of the disc controller means, connected to the rotational position sensing means for controlling the servo tracking signal generating means to produce the servo tracking signal as a function of the error signal and the rotational position of the disc.

9. A method of controlling a magnetic head carriage while reading and writing data on a magnetic disc comprising the steps of recording data edges along radial lines on said disc,
recording data on the disc in concentric tracks, with adjacent tracks being recorded with a relative magnetic head gap angle of ninety degrees,
magnetically sensing adjacent track data edges as the disc is rotated, and from the timing and phasing of the data edges determining the amount and direction of track eccentricity, and
using this eccentricity information to provide a countermotion control force to the head carriage to eliminate mistracking due to such eccentricity.

10. The method of claim 9 wherein the last recited step further comprises the steps of generating said counter-motion control force as a function, in part, of the radial distance of the head carriage from the axis of rotation of the disc and the rotational position of the disc.

11. The method of claim 10 further comprising the step of generating the eccentricity information as an electrical signal, storing the signal, and replaying the stored signal to generate the counter motion control force while recording data on the disc.

* * * * *